(12) United States Patent
Lee et al.

(10) Patent No.: US 9,553,289 B2
(45) Date of Patent: Jan. 24, 2017

(54) BATTERY MODULE

(71) Applicant: SAMSUNG SDI CO., LTD., Yongin-si, Gyeonggi-do (KR)

(72) Inventors: Jang-Wook Lee, Yongin-si (KR); Jang-Yeong Im, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 226 days.

(21) Appl. No.: 14/226,390

(22) Filed: Mar. 26, 2014

(65) Prior Publication Data

US 2015/0030894 A1    Jan. 29, 2015

Related U.S. Application Data (60) Provisional application No. 61/858,834, filed on Jul. 26, 2013.

(51) Int. Cl.
H01M 2/12 (2006.01)
H01M 10/04 (2006.01)
H01M 2/10 (2006.01)

(52) U.S. Cl.
CPC ......... H01M 2/1252 (2013.01); H01M 2/1061 (2013.01); H01M 2/1077 (2013.01); H01M 2/12 (2013.01); H01M 10/0486 (2013.01)

(58) Field of Classification Search
CPC . H01M 2/1061; H01M 2/1077; H01M 2/1252
See application file for complete search history.

(56) References Cited

U.S. PATENT DOCUMENTS

| | | | |
|---|---|---|---|
| 2003/0049521 A1* | 3/2003 | Iwase | H01M 2/043 429/82 |
| 2009/0142650 A1* | 6/2009 | Okada | H01M 2/1077 429/71 |
| 2010/0255359 A1* | 10/2010 | Hirakawa | H01M 2/12 429/120 |

(Continued)

FOREIGN PATENT DOCUMENTS

| | | |
|---|---|---|
| EP | 2 381 507 A1 | 10/2011 |
| JP | 2009-170258 A | 7/2009 |

(Continued)

OTHER PUBLICATIONS

Office Action mailed Dec. 2, 2014 in corresponding European Patent Application No. 14178306.8.

*Primary Examiner* — Scott J Chmielecki
(74) *Attorney, Agent, or Firm* — Lee & Morse, P.C.

(57) ABSTRACT

A battery module with a plurality of battery cells arranged in a first direction in a battery array, the battery module including a plurality of barriers in which a pair of adjoining ones of the barriers mount a battery cell therebetween, a frame having at least a pair of opposed frame members, the battery array and the barriers being between the opposed frame members and disposed internally thereof, the frame including a pair of end blocks at outermost sides of the battery array, side frames connecting the end blocks, and a degassing portion overlying vent portions of each of the plurality of battery cells and providing a passage for directing vented gas from the battery cells away from the battery module, the degassing portion rigidly supporting the battery cells and barriers of the battery array within the frame.

18 Claims, 8 Drawing Sheets

(56) References Cited

U.S. PATENT DOCUMENTS

| | | | |
|---|---|---|---|
| 2011/0256446 A1* | 10/2011 | Bronczyk | H01M 2/1077 429/163 |
| 2012/0094155 A1* | 4/2012 | Lim | H01M 2/12 429/82 |
| 2012/0270083 A1* | 10/2012 | Kim | H01M 2/043 429/87 |
| 2013/0189559 A1* | 7/2013 | Giere | H01M 10/655 429/120 |
| 2014/0272513 A1* | 9/2014 | Sun | H01M 10/5057 429/120 |

FOREIGN PATENT DOCUMENTS

| | | |
|---|---|---|
| JP | 2010-251019 A | 11/2010 |
| KR | 10-2011-0044129 A | 4/2011 |
| KR | 2012-0047800 A | 5/2012 |

* cited by examiner

BATTERY MODULE

CROSS-REFERENCE TO RELATED APPLICATION

The present application claims priority under 35 U.S.C. §119(e) to U.S. Provisional Application No. 61/858,834, filed on Jul. 26, 2013, and entitled: "BATTERY MODULE," which is incorporated herein by reference in its entirety.

BACKGROUND

1. Field

Embodiments relate to a battery module.

2. Description of the Related Art

In general, secondary batteries may be reused by repeatedly discharging and recharging, unlike primary batteries, which are not rechargeable. The secondary batteries may be used as energy sources for mobile devices, electric vehicles, hybrid vehicles, electric bicycles, and uninterruptible power supplies. The secondary batteries may be used in a single battery type or a battery module type (composed of a plurality of batteries connected in one unit), in accordance with the requirements of various available external devices.

SUMMARY

Embodiments are directed to a battery module.

The embodiments may be realized by providing a battery module with a plurality of battery cells arranged in a first direction in a battery array, the battery module including a plurality of barriers in which a pair of adjoining ones of the barriers mount a battery cell therebetween, a frame having at least a pair of opposed frame members, the battery array and the barriers being between the opposed frame members and disposed internally thereof, the frame including a pair of end blocks at outermost sides of the battery array, side frames connecting the end blocks, and a degassing portion overlying vent portions of each of the plurality of battery cells and providing a passage for directing vented gas from the battery cells away from the battery module, the degassing portion rigidly supporting the battery cells and barriers of the battery array within the frame.

The barriers may include coupling portions for coupling the barriers to each other, the pair of adjacent barriers being coupled to each other by the coupling portions.

Each coupling portion may include a protruding portion protruding in the first direction on one side of the barrier, and a receiving portion on another side of the barrier, and the protruding portion of one of the barriers may be coupled with the receiving portion of an adjacent barrier along the first direction.

One of the end blocks may include a protruding portion protruding in the first direction, the other of the end blocks includes a receiving portion, the protruding portion of the one end block being coupled with the coupling portion of a barrier adjacent thereto, and the receiving portion of the other end block being coupled with the coupling portion of a barrier adjacent thereto.

The battery module may further include a reinforcing barrier in between adjacent battery cells in a central region of the battery array.

The reinforcing barrier may include a fastening portion for fastening the degassing portion to the reinforcing barrier.

The degassing portion may be fastened to the fastening portion of the reinforcing barrier with a band portion that extends from the fastening portion around an outer side of the degassing portion.

The band portion may be bolted to the fastening portion of the reinforcing barrier.

The reinforcing barrier may be coupled with side frames of the frame.

A maximum thickness of the reinforcing barrier along the first direction may be greater than a maximum thickness of each of the barriers along the first direction.

The reinforcing barrier may be formed of an insulating material.

The reinforcing barrier may include a coupling portion for coupling with the coupling portions of the barriers.

The side frames may include an upper bent surface overlying an edge of the battery array, and a lower bent surface underlying an edge of the battery array.

The battery module may further include a buffer member between at least one of the upper bent surface and the battery array and the lower bent surface and the battery array.

The buffer member may suppress external vibrations or shock from being transferred to the battery cells of the battery array.

Ends of the degassing portion may be fastened to respective ones of the end blocks with band portions, each band portion extending around an outer side of the degassing portion.

The side frames may include a rigid metal.

The degassing portion may include individual inlets corresponding with respective ones of the vent portions of the battery cells, the inlets directing vented gas to a hollow flow path of the degassing portion.

The degassing portion may include a rigid metal material.

The rigid metal material may include stainless steel.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, or one or more intervening elements may also be present. In addition, it will also be understood that when an element is referred to as being "between" two elements, it can be the only element between the two elements, or one or more intervening elements may also be present. Like reference numerals refer to like elements throughout.

Also, when an element is referred to as being "connected to" another element, it can be directly connected to the another element or be indirectly connected to the another element with one or more intervening elements interposed therebetween.

Figure 1:
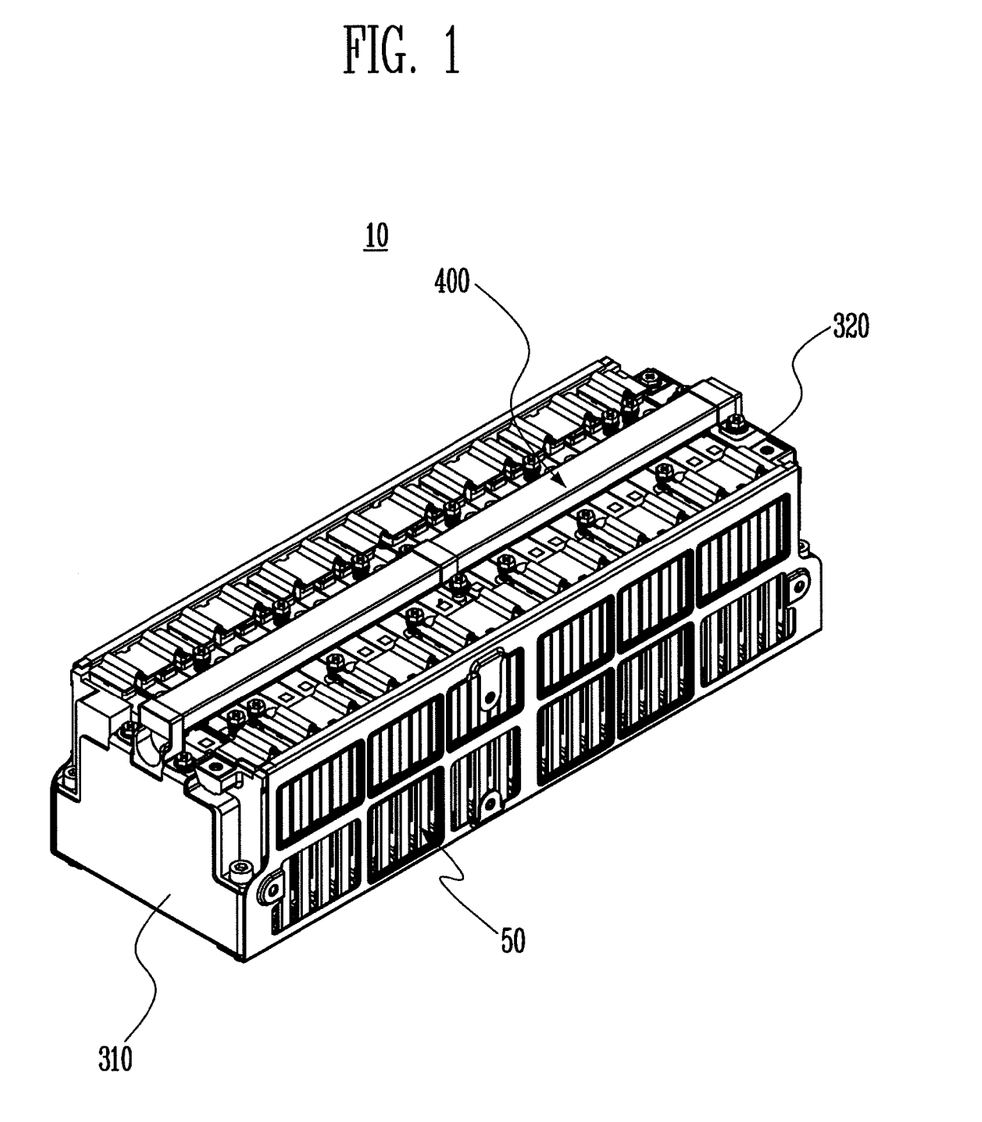
FIG. 1 illustrates a perspective view showing a battery module according to an embodiment.
Figure 2:
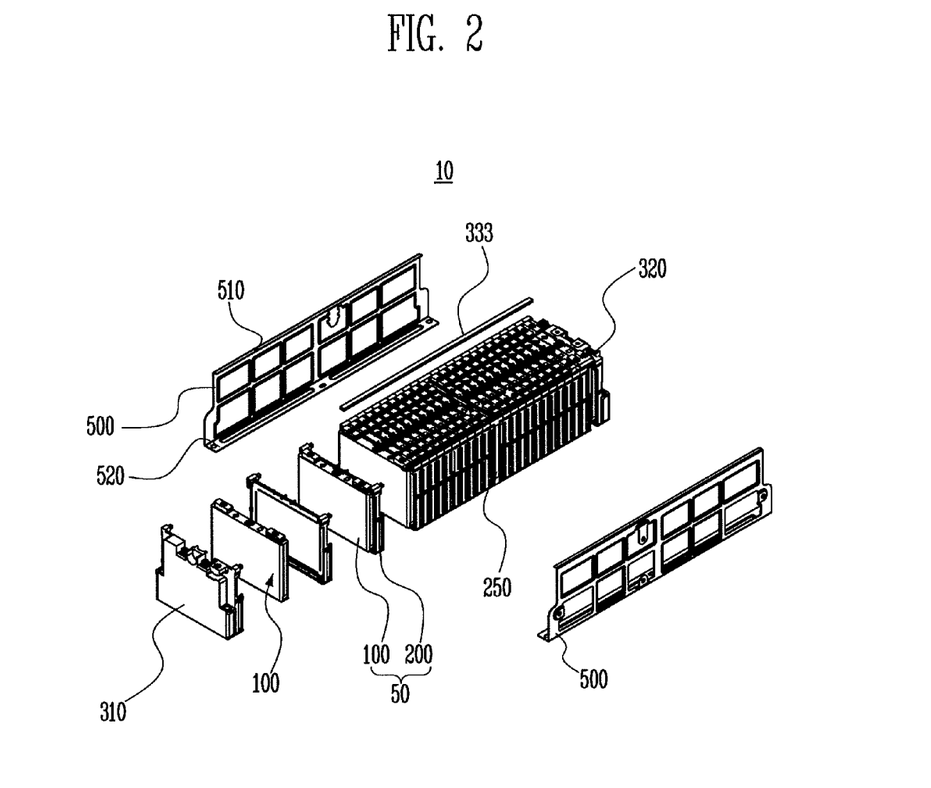
FIG. 2 illustrates an exploded perspective view showing the battery module according to an embodiment.

A battery module according to an embodiment will be described with reference to FIGS. 1 and 2. FIG. 1 illustrates a perspective view of a battery module according to an embodiment. FIG. 2 illustrates an exploded perspective view of the battery module according to an embodiment.

As shown in FIGS. 1 and 2, the battery module 10 according to this embodiment may have an outer frame structure, e.g., frame, in which a battery array 50 may be regularly fixed. The outer frame structure or frame may include at least a par of opposed frame members. The battery array 50 may be between the opposed frame members, and may be disposed internally therein. For example, the opposed frame members may include, e.g., side frames 500 and/or end blocks 310 and 320. In an implementation, the frame may include a reinforcing barrier 250.

The battery array 50 may be formed so that a plurality of battery cells 100 and barriers 200 are arranged in one direction. A degassing portion 400 (configured to guide gas toward an outside of the battery module 10) may be provided at an upper portion of the battery array 50. For example, the degassing portion 400 may overlie vent portions of each of the plurality of battery cells 100, and may provide a passage for directing vented gas from the battery cells 100 away from the battery module 10. The gas may be exhausted from the battery cells 100 of the battery array 50. The configuration and fastening of the degassing portion 400 will be described in detail below. For example, the degassing portion 400 may rigidly support the battery cells 100 and barriers 200 of the battery array 50 within the frame.

The pair of end blocks 310 and 320 may be respectively provided at both end portions of or at outermost sides of the barrier array 50, i.e., outside of the outermost battery cells 100. The side frames 500 may be respectively provided at sides of the battery cells 100 and the barriers 200. For example, the side frames 500 may connect the pair of end blocks 310 and 320. In an implementation, the side frames 500 may include a rigid metal.

In an implementation, the frames 500 and the end blocks 310 and 320 may be firmly fixed through, e.g., structural coupling or screw fastening. If desired, upper and lower portions of the side frame 500 may be bent to directly/indirectly support upper and lower portions of the battery array 50.

As a length of the battery module 10 gradually increases, e.g., by adding additional battery cells 100 to the battery module 10, an external shape of the battery module 10 may be changed due to the weight of the battery cells 100 in the battery module 10. The battery module 10 according to the present embodiment may include the reinforcing barrier 250 at or near a central portion thereof. Thus, structural stability of the battery module 10 may be improved.

In order to help increase the structural rigidity of the battery module 10, an upper bent surface 510 and a lower bent surface 520 may be respectively formed at upper and lower end portions of the side frame 500. Each of the upper and lower bent surfaces 510 and 520 may be formed in a shape bent toward the battery array 50. For example, the upper bend surface 510 may overlie an edge of the battery array 50 and/or the lower bent surface 520 may underlie an edge of the battery array 50.

A buffer member 333 may be provided between the battery array 50 and at least one of the upper bent surface 510 and the lower bent surface 520. The buffer member 333 may absorb impact between the upper bent surface 510 and the battery array 50, so that it is possible to reduce, prevent, and or suppress external vibration, shock, or the like from being transferred to the battery cell 110.

Figure 3:
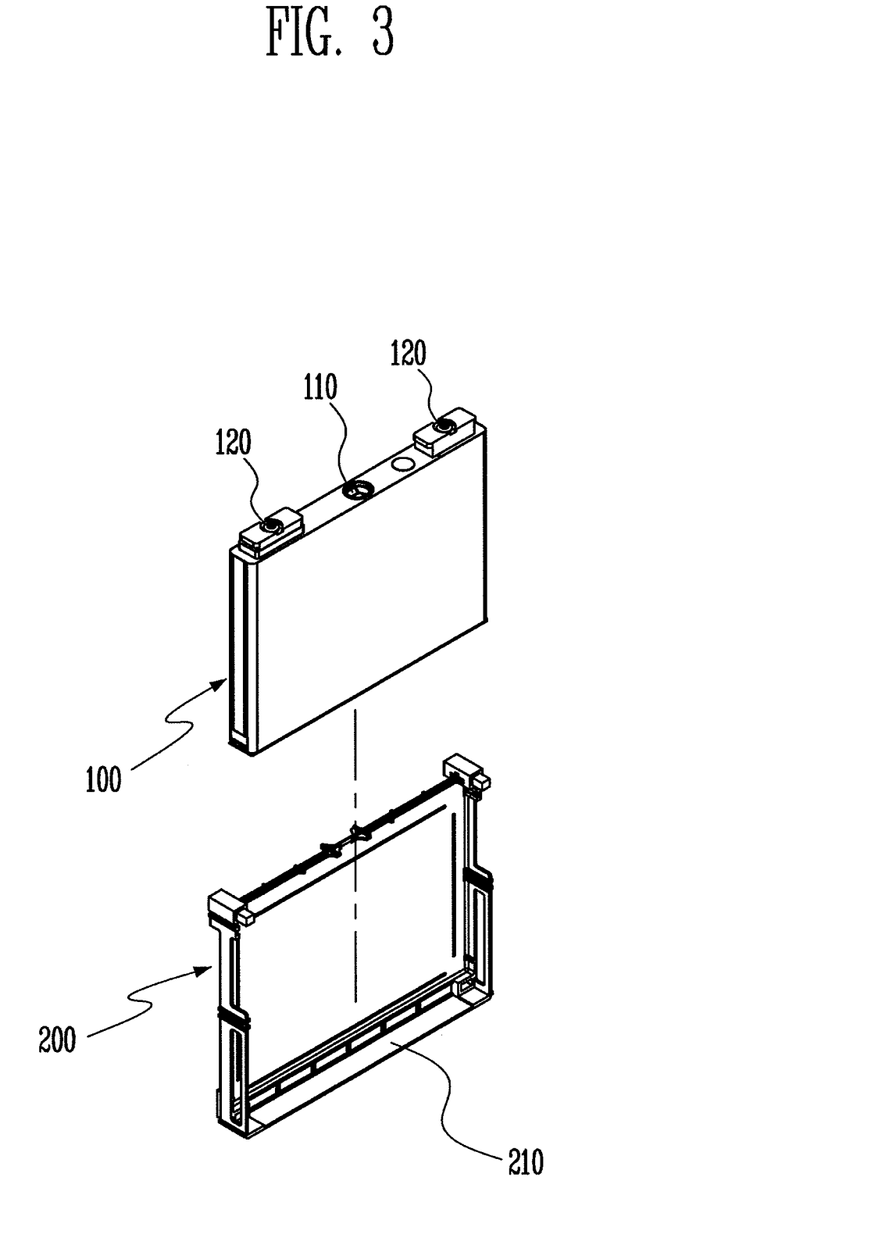
FIG. 3 illustrates an exploded perspective view showing a barrier and a battery cell according to an embodiment.

The battery cell and the barrier according to the present embodiment will be described with reference to FIG. 3. FIG. 3 illustrates an exploded perspective view showing the barrier and the battery cell according to an embodiment.

The battery cell 100 may have electrical terminals 120 exposed at an upper portion thereof, and a vent portion 110 between the terminals 120. The vent portion 110 may be a portion through which internal gas (caused by, e.g., an abnormal operation of the battery cell 100) is exhausted to the outside of the battery cell 100.

The barrier 200 may be formed as a partition wall that spaces the battery cell 100 apart from the other battery cells. The barrier 200 may serve as a structure that maintains an exact interval between the battery cells 10 or may press the battery cells 100. The barrier 200 according to the present embodiment may include a battery mounting portion 210 therein. The battery cell 100 may be mounted on or in the battery mounting portion 210. The battery cell 100 and the barrier 200 may be repetitively and/or alternately arranged in a state in which the battery cell 100 and the barrier 200 are coupled as described above.

Figure 4:
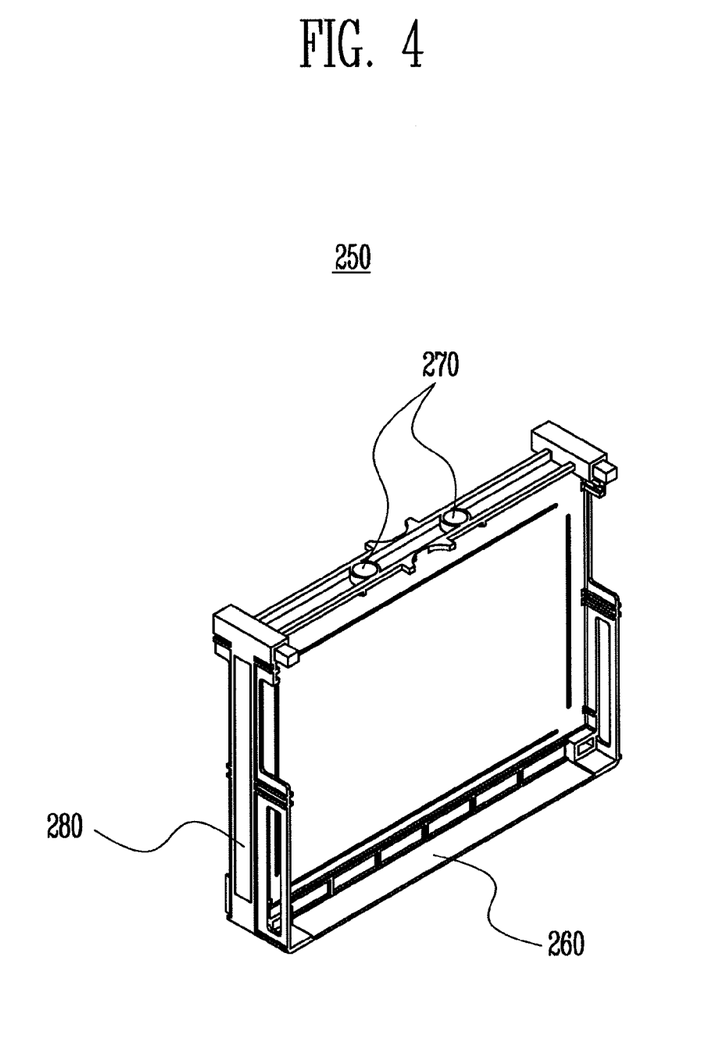
FIG. 4 illustrates a perspective view showing a reinforcing barrier according to an embodiment.

The reinforcing barrier will be described with reference to FIG. 4. FIG. 4 illustrates a perspective view showing the reinforcing barrier according to an embodiment.

As shown in FIG. 4, a shape of the reinforcing barrier 250 may be similar to that of the barrier 200 described above. For example, the reinforcing barrier 250 may be entirely formed into a partition wall structure, and a mounting portion 260 may be formed at a lower portion of the reinforcing barrier 250 so that the battery cell 100 may be mounted thereon.

In an implementation, the reinforcing barrier 250 may be a barrier that performs not only a simple function of spacing the battery cells 100 apart from each other and maintaining the interval between the battery cells 100, but also a function of forming an outer frame structure, i.e., a rigidity structure of the battery module 10 by being fastened to other portions or elements. For example, a fastening hole 270 (through which the reinforcing barrier 250 is fastened to other portions or elements) may be formed in the reinforcing barrier 250. The fastening hole 270 may facilitate fixing of the degassing portion using a band member (450, see FIG. 9). This will be described in detail below.

The reinforcing barrier 250 may have various types of fastening structures so that the side frames 500 may be fastened to or coupled with a surface 280 of the reinforcing barrier 250 that faces the side frames 500. For example, a bolt receiving hole (corresponding to a bolt) may be formed in the surface 280 of the reinforcing barrier 250, so that the surface 280 may be fastened to or coupled with the side frames 500. As such, the reinforcing barrier 250 may help increase the rigidity of the battery module 10. Therefore, a thickness of the reinforcing barrier 250 may be further increased, as compared with the other barriers 200. For example, a maximum thickness of the reinforcing barrier 250 along the one or first direction may be greater than a maximum thickness of each of the barriers 200 along the first direction.

The side frame 500 may be a portion of the battery module 10 on which part or most of an entire load of the battery module 10 is concentrated. The side frame 500 may be formed using a material, e.g., stainless steel, which has a certain rigidity. On the other hand, like a barrier 200, the reinforcing barrier 250 may perform a function of spacing the battery cells 100 apart from each other and insulating the battery cells 100 from each other. For example, the reinforcing barrier 250 may be formed of a synthetic resin material.

Figure 5:
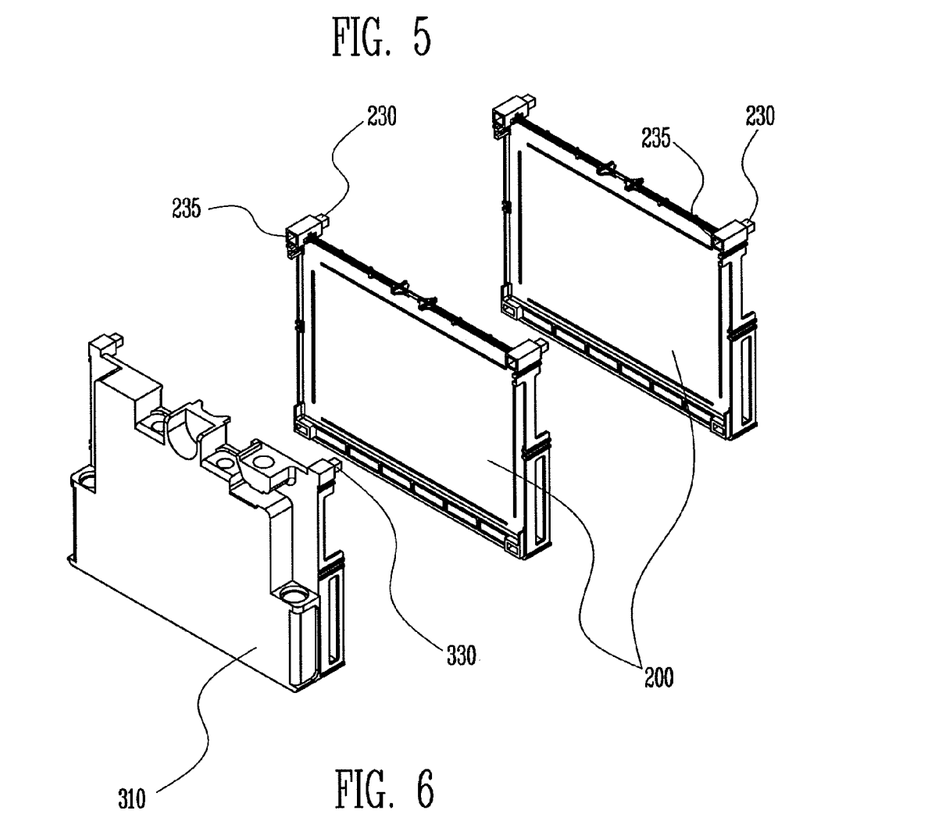
FIG. 5 illustrates an exploded perspective view showing a coupling structure between an end block and barriers according to an embodiment.

A coupling structure between the end block and the barriers will be described with reference to FIG. 5. FIG. 5 illustrates an exploded perspective view showing the coupling structure between the end block and the barriers according to an embodiment.

One end block 310 may be provided at the outermost portion of the battery module 10. The battery module may have a coupling structure in which the end block 310 and the barrier 200 are coupled with each other. The barrier 200 according to the present embodiment may include a coupling portion for, e.g., coupling the barriers 200 to each other. For example, the coupling portions may include protruding portions 230 respectively formed at ends of an upper portion of the barrier 200. In an implementation, the protruding portion 230 may protrude in an arrangement direction of the battery cells 100. The coupling portions may further include a receiving portion 235 (corresponding to a shape of the protruding portion 230) at an opposite side of the barrier 200 relative to the protruding portion 230. Thus, each barrier 200 may include the protruding portion 230 protruding in one direction, and a receiving portion 235 at the other side to receive the protruding portion 230. For example, the protruding portion 230 of one barrier 200 may be coupled with the receiving portion 235 of another barrier 200 (adjacent to the one barrier 200). The one end block 310 may only have protruding portions 330 protruding toward the barrier 200, and another end block 320 may have only receiving portions 335 (corresponding to the respective protruding portions 330). Accordingly, the one end block 310 and the barriers 200 may be coupled to each other through the coupling structure described above.

Figure 6:
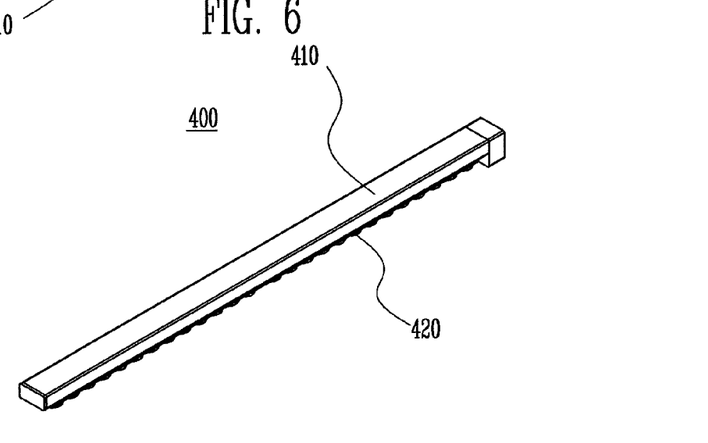
FIG. 6 illustrates a perspective view showing a degassing portion according to an embodiment.
Figure 7:
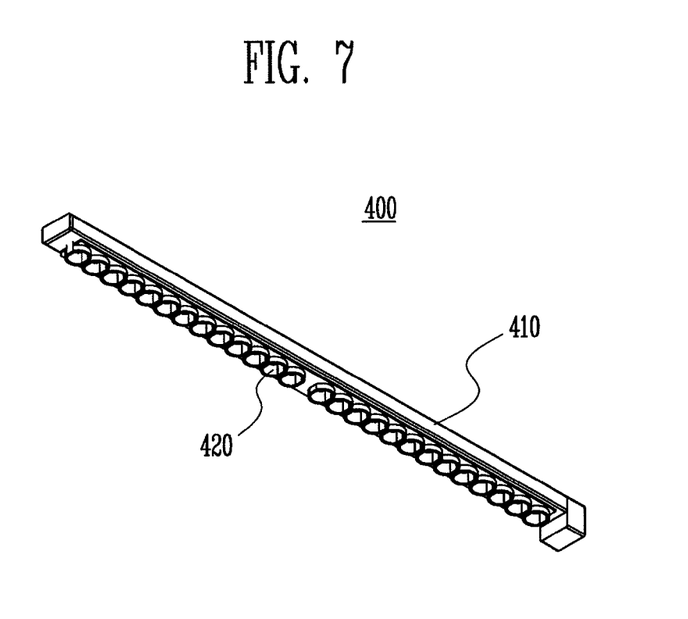
FIG. 7 illustrates a bottom perspective view showing the degassing portion according to an embodiment.

The degassing portion will be described with reference to FIGS. 6 and 7. FIG. 6 illustrates a perspective view showing the degassing portion according to an embodiment. FIG. 7 illustrates a bottom perspective view showing the degassing portion according to an embodiment.

The degassing portion 400 according to the present embodiment may be formed in the shape of a hollow rectangular parallelepiped. For example, individual inlets 420 (through which the gas exhausted through the vent portions of the battery cells 100 flows) may be formed on or in a bottom surface of the degassing portion 400. A flow path (through which the gas flowing in the degassing 410 and from the inlets 420 is guided to the outside of the battery module 10) may be formed inside a body 410 of the degassing portion 400.

Figure 8:
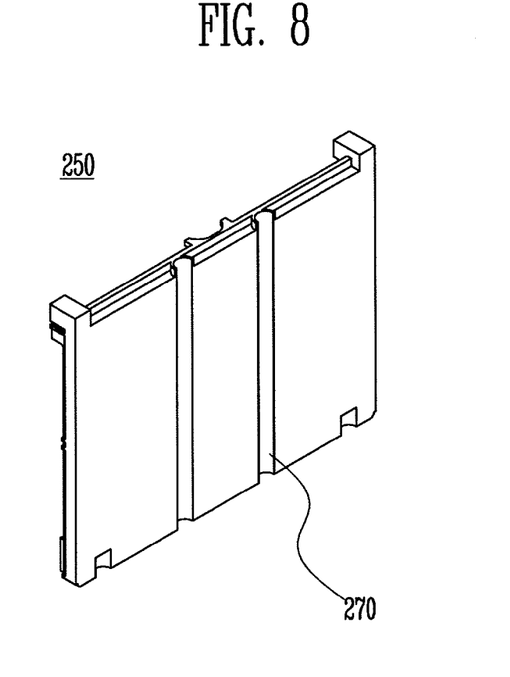
FIG. 8 illustrates a longitudinal sectional view showing the reinforcing barrier according to an embodiment.
Figure 9:
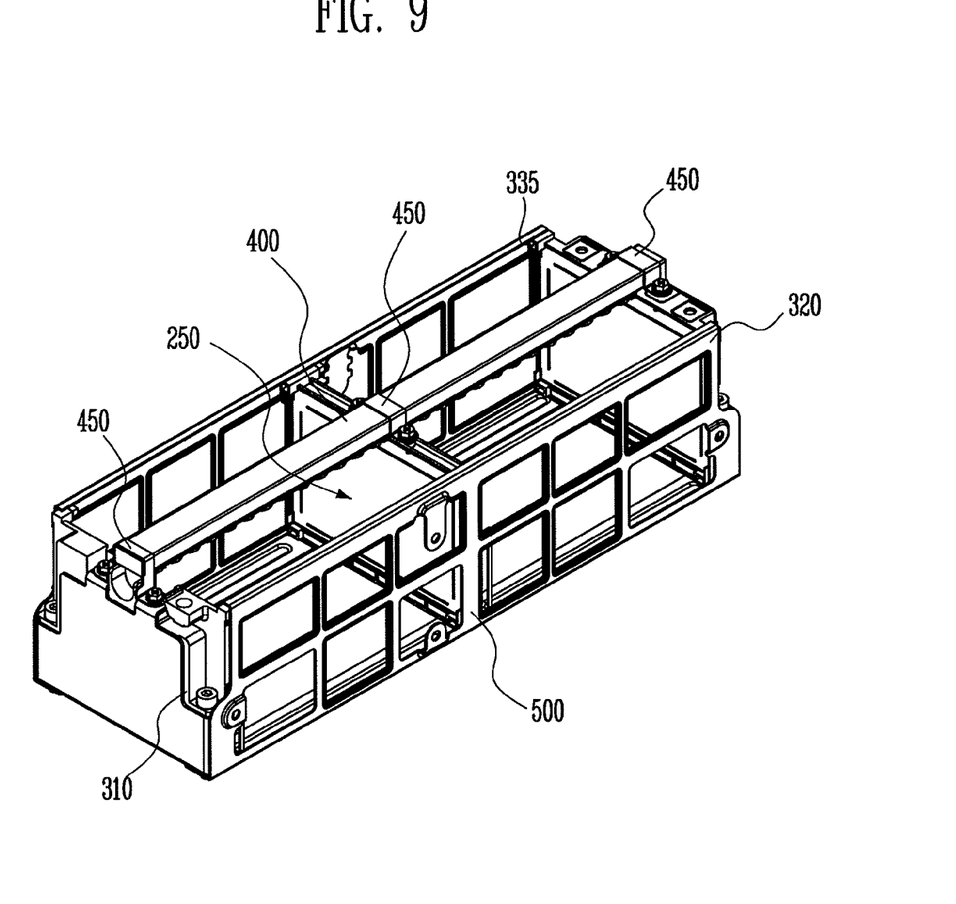
FIG. 9 illustrates a perspective view showing a rigidity structure including the degassing portion according to an embodiment.
Figure 10:
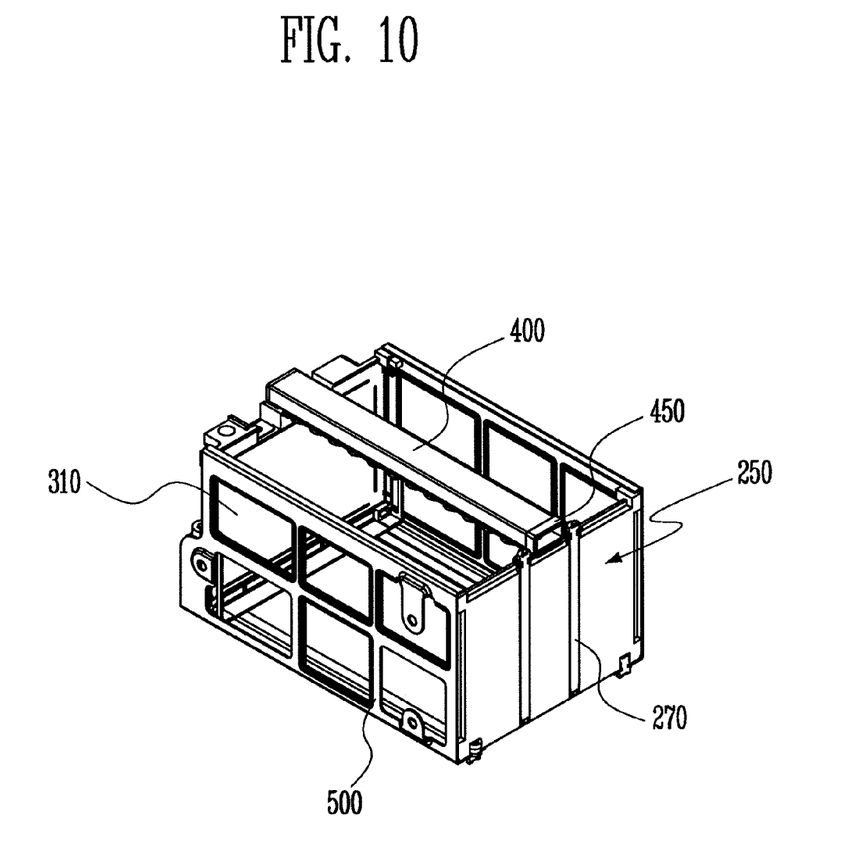
FIG. 10 illustrates a longitudinal sectional view showing a state in which a central portion of the rigidity structure of FIG. 9 is cut away.

The outer frame structure, i.e., the frame or rigidity structure of the battery module, will be described with FIGS. 8 to 10. FIG. 8 illustrates a longitudinal sectional view showing the reinforcing barrier according to an embodiment. FIG. 9 illustrates a perspective view showing the rigidity structure including the degassing portion according to an embodiment. FIG. 10 illustrates a longitudinal sectional view showing a state in which a central portion of the rigidity structure of FIG. 9 is cut away.

As described above, the reinforcing barrier 250 may include the fastening hole 270, e.g., passing through the top and bottom thereof. As shown in FIG. 9, the side frames 500 and the pair of end blocks 310 and 320 may be fastened, coupled, or fixed to each other, so as to form the frame or outer frame structure, in terms of the structure of the battery module 10. In an implementation, end portions of the reinforcing barrier 250 may be respectively fixed to central portions of the side frames 500. The reinforcing barrier 250 may be fixed to or coupled with the degassing portion 400 through the band member 450. The degassing portion 400 may also be fixed to the end blocks 310 and 320 through other band members 450.

A central portion of the band member 450 may surround an outer circumferential surface of the degassing portion 400, and end portions of the band member 450 may be fixed to or coupled with the fastening hole 270 by, e.g., bolts as shown in FIG. 10. For example, ends of the degassing portion 400 may be fastened to respective ones of the end blocks 310, 320 with band members 450, each band member 450 extending around an outer side of the degassing portion 400. The degassing portion 400 according to the present embodiment may be formed of a metal material, e.g., a rigid metal material. For example, the rigid metal material may include stainless steel.

In other types of battery modules, components related to degassing may be simply limited to the function of exhausting internal gas to the outside of the battery module. However, in the battery module according to the present embodiment, the degassing portion 400 may be formed of the, e.g., rigid, metal material, and the coupling structure between the degassing portion 400 and the rigidity structure or frame may be introduced to the battery module 10. Thus, it is possible to increase the structural rigidity of the entire battery module 10.

For example, the degassing portion 400 may be made of the metal material, and may be connected to or coupled with the reinforcing barrier 250, the side frame 500, or the like. Thus, it is possible to reduce and/or prevent the rigidity structure from being distorted at the central portion of the degassing portion 400 or from being sunk or sagging downwardly, due to the weight of the battery cells 10.

By way of summation and review, although small mobile devices, e.g., cellular phones, may operate for a certain period of time with the output and capacity of a single battery, electric modules having larger output and capacity may be more suitable to operate electric vehicles and hybrid vehicles with high power for a long time because such vehicles consume a large amount of electricity. The battery modules may be used by connecting a required number of batteries in parallel or series in accordance with desired output and capacity.

The embodiments may provide a battery module having a degassing portion that may help improve structural stability of the battery module, in addition to performing a degassing function.

The embodiments may also provide a battery module having a coupling structure between barriers, which may help improve the structural rigidity of the battery module.

According to an embodiment, the outer frame structure of the battery module may be formed using the side frames, the end blocks, and the degassing portion (made of a metal material). Thus, it is possible to improve the structural rigidity of the entire battery module.

According to an embodiment, the buffer member may be provided between the side frame and the battery array, so that although the battery module may be used for an electric vehicle or hybrid vehicle, it is possible to reduce and/or prevent external vibration from being directly transferred to the battery cells.

According to an embodiment, the reinforcing barrier may be fixed to the degassing portion (made of the metal material), so that it is possible to maintain the structural stability of the battery module even when an entire length of the battery module is increased.

The embodiments provide a battery module for an electric vehicle, a hybrid vehicle, etc.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module with a plurality of battery cells arranged in a first direction in a battery array, the battery module comprising:
    a plurality of barriers in which a pair of adjoining ones of the barriers mount a battery cell therebetween,
    a frame having at least a pair of opposed frame members, the battery array and the barriers being between the opposed frame members and disposed internally thereof, the frame including:
    a pair of end blocks at outermost sides of the battery array, side frames connecting the end blocks,
    a degassing portion overlying vent portions of each of the plurality of battery cells and providing a passage for directing vented gas from the battery cells away from the battery module, the degassing portion rigidly supporting the battery cells and barriers of the battery array within the frame; and
    a reinforcing barrier in between adjacent battery cells in a central region of the battery array, wherein:
    the degassing portion continuously extends from one end of the battery array to another end of the battery array and across the central region of the battery array,
    the reinforcing barrier includes a fastening portion for fastening the degassing portion to the reinforcing barrier, and
    the reinforcing barrier includes:
        a partition wall completely separating two adjacent battery cells,
        a side surface extending perpendicularly from a plane of the partition wall to cover at least a portion of a sidewall of the two adjacent battery cells, and
        a mounting portion underlying a side of one of the two adjacent battery cells, the side being opposite to a side that includes the vent portion therein.

2. The battery module as claimed in claim 1, wherein the barriers include coupling portions for coupling the barriers to each other, the pair of adjacent barriers being coupled to each other by the coupling portions.

3. The battery module as claimed in claim 2, wherein:
    each coupling portion includes a protruding portion protruding in the first direction on one side of the barrier, and a receiving portion on another side of the barrier, and
    the protruding portion of one of the barriers is coupled with the receiving portion of an adjacent barrier along the first direction.

4. The battery module as claimed in claim 2, wherein one of the end blocks includes a protruding portion protruding in the first direction, the other of the end blocks includes a receiving portion, the protruding portion of the one end block being coupled with the coupling portion of a barrier adjacent thereto, and the receiving portion of the other end block being coupled with the coupling portion of a barrier adjacent thereto.

5. The battery module as claimed in claim 1, wherein the degassing portion is fastened to the fastening portion of the reinforcing barrier with a band portion that extends from the fastening portion around an outer side of the degassing portion.

6. The battery module as claimed in claim 5, wherein the band portion is bolted to the fastening portion of the reinforcing barrier.

7. The battery module as claimed in claim 1, wherein the reinforcing barrier is coupled with side frames of the frame.

8. The battery module as claimed in claim 1, wherein a maximum thickness of the reinforcing barrier along the first direction is greater than a maximum thickness of each of the barriers along the first direction.

9. The battery module as claimed in claim 1, wherein the reinforcing barrier is formed of an insulating material.

10. The battery module as claimed in claim 1, wherein the reinforcing barrier includes a coupling portion for coupling with the coupling portions of the barriers.

11. The battery module as claimed in claim 1, wherein the side frames include an upper bent surface overlying an edge of the battery array, and a lower bent surface underlying an edge of the battery array.

12. The battery module as claimed in claim 11, further comprising a buffer member between at least one of the upper bent surface and the battery array and the lower bent surface and the battery array.

13. The battery module as claimed in claim 12, wherein the buffer member suppresses external vibrations or shock from being transferred to the battery cells of the battery array.

14. The battery module as claimed in claim 1, wherein ends of the degassing portion are fastened to respective ones of the end blocks with band portions, each band portion extending around an outer side of the degassing portion.

15. The battery module as claimed in claim 1, wherein the side frames include a rigid metal.

16. The battery module as claimed in claim 1, wherein the degassing portion includes individual inlets corresponding with respective ones of the vent portions of the battery cells, the inlets directing vented gas to a hollow flow path of the degassing portion.

17. The battery module as claimed in claim 1, wherein the degassing portion includes a rigid metal material.

18. The battery module as claimed in claim 17, wherein the rigid metal material is stainless steel.

* * * * *